United States Patent
Leiber et al.

(10) Patent No.: US 9,878,697 B2
(45) Date of Patent: Jan. 30, 2018

(54) ACTUATING DEVICE FOR A MOTOR VEHICLE BRAKE SYSTEM

(75) Inventors: Heinz Leiber, Oberriexingen (DE); Valentin Unterfrauner, Munich (DE)

(73) Assignee: IPGATE AG, Pfäffikon Sz (CH)

( * ) Notice: Subject to any disclaimer, the term of this patent is extended or adjusted under 35 U.S.C. 154(b) by 1285 days.

(21) Appl. No.: 13/883,971

(22) PCT Filed: Sep. 6, 2011

(86) PCT No.: PCT/EP2011/004476
§ 371 (c)(1),
(2), (4) Date: May 7, 2013

(87) PCT Pub. No.: WO2012/034661
PCT Pub. Date: Mar. 22, 2012

(65) Prior Publication Data
US 2013/0298550 A1    Nov. 14, 2013

(30) Foreign Application Priority Data

Sep. 17, 2010  (DE) .................. 10 2010 045 617
Nov. 3, 2010   (DE) .................. 10 2010 050 133

(51) Int. Cl.
*B60T 13/74*    (2006.01)
*B60T 7/04*     (2006.01)
(Continued)

(52) U.S. Cl.
CPC ............. *B60T 13/74* (2013.01); *B60T 7/042* (2013.01); *B60T 8/4077* (2013.01); *B60T 13/686* (2013.01); *B60T 13/745* (2013.01)

(58) Field of Classification Search
CPC ...... B60T 7/042; B60T 8/4077; B60T 13/686; B60T 13/745; B60T 13/74
(Continued)

(56) References Cited

U.S. PATENT DOCUMENTS 5,941,608 A * 8/1999 Campau .................. B60T 7/042
                                                    303/113.4
6,132,010 A * 10/2000 Holt ....................... B60T 8/4045
                                                    303/11
(Continued)

FOREIGN PATENT DOCUMENTS

DE    20308810 U1    8/2003
DE    10338046 A1 *  3/2005 ................ B60T 7/12
(Continued)

OTHER PUBLICATIONS

International Search Report and Written Opinion issued in PCT/EP2011/004476, dated Jan. 23, 2012 with English translation of International Search Report.
(Continued)

*Primary Examiner* — Thomas J Williams
*Assistant Examiner* — Mariano Sy
(74) *Attorney, Agent, or Firm* — Panitch Schwarze Belisario & Nadel LLP

(57) ABSTRACT

The invention relates to an actuating device for a vehicle brake system, comprising a first piston-cylinder unit, the at least one working space of which is to be connected to at least one wheel brake of the vehicle via at least one hydraulic line, further comprising an electromechanical drive device and an actuating device, in particular a brake pedal, and to a method for operating an actuating device for a vehicle brake system. According to the invention, the actuating device comprises a further piston-cylinder unit (6, 41), the piston (6) of which can be actuated by means of the actuating device (10, 5) and is connected to a piston of the first piston-cylinder unit (4) via a connecting device.

17 Claims, 4 Drawing Sheets

(51) Int. Cl.
  *B60T 8/40* (2006.01)
  *B60T 13/68* (2006.01)
(58) Field of Classification Search
  USPC .............................. 303/115.1, 114.1, 15, 20
  See application file for complete search history.

(56) References Cited

U.S. PATENT DOCUMENTS

| | | | | |
|---|---|---|---|---|
| 7,472,011 | B2* | 12/2008 | Fenske | B60T 17/228 |
| | | | | 246/167 R |
| 8,449,047 | B2* | 5/2013 | Drumm | 188/358 |
| 8,468,820 | B2* | 6/2013 | Drumm | B60T 7/042 |
| | | | | 60/545 |
| 9,199,618 | B2* | 12/2015 | Drumm | B60T 1/10 |
| 9,227,611 | B2* | 1/2016 | Gilles | B60T 8/3275 |
| 2008/0258545 | A1* | 10/2008 | Drumm | B60T 8/3275 |
| | | | | 303/114.1 |
| 2009/0026835 | A1* | 1/2009 | Matsubara | B60T 7/12 |
| | | | | 303/15 |
| 2010/0225159 | A1* | 9/2010 | Drumm | B60T 8/4077 |
| | | | | 303/20 |
| 2011/0031072 | A1* | 2/2011 | Leiber | B60T 8/00 |
| | | | | 188/72.3 |
| 2011/0115282 | A1* | 5/2011 | Dinkel | B60T 7/042 |
| | | | | 303/3 |
| 2011/0178687 | A1* | 7/2011 | Anderson | B60T 13/745 |
| | | | | 701/70 |
| 2012/0091788 | A1* | 4/2012 | Weiberle | B60T 7/042 |
| | | | | 303/15 |
| 2012/0198959 | A1* | 8/2012 | Leiber | B60T 7/042 |
| | | | | 74/514 |

FOREIGN PATENT DOCUMENTS

| | | | |
|---|---|---|---|
| DE | 102004011622 A1 | 3/2005 | |
| DE | 102005036638 A1 | 4/2006 | |
| DE | 102005018649 A1 | 10/2006 | |
| DE | 102006056907 A1 | 12/2007 | |
| DE | 102006056907 A1 | 12/2007 | |
| DE | 102007049620 A1 | 10/2008 | |
| DE | 102007062839 A1 | 6/2009 | |
| DE | 102008035180 A1 | 2/2010 | |
| DE | 102008060031 A1 | 6/2010 | |
| DE | 102008063771 A1 | 6/2010 | |
| DE | 102009031672 A1 | 1/2011 | |
| DE | 102009055721 A1 | 6/2011 | |
| DE | 102010039345 A1 | 2/2012 | |
| DE | 102010045617 A1 | 3/2012 | |
| WO | WO-2009065884 A1 | 5/2009 | |
| WO | WO 2010006996 A1 * | 1/2010 | ............ B60T 13/745 |

OTHER PUBLICATIONS

Inernational Preliminary Report on Patentability issued in PCT/EP2011/004476, dated Mar. 19, 2013.
Office Action dated Jul. 7, 2017 in DE Application No. 112011102270.0.
Office Action dated Jul. 26, 2017 in DE Application No. 112011106127.7.
Office Action dated Jul. 24, 2017 in DE Application No. 112011102270.0.

* cited by examiner

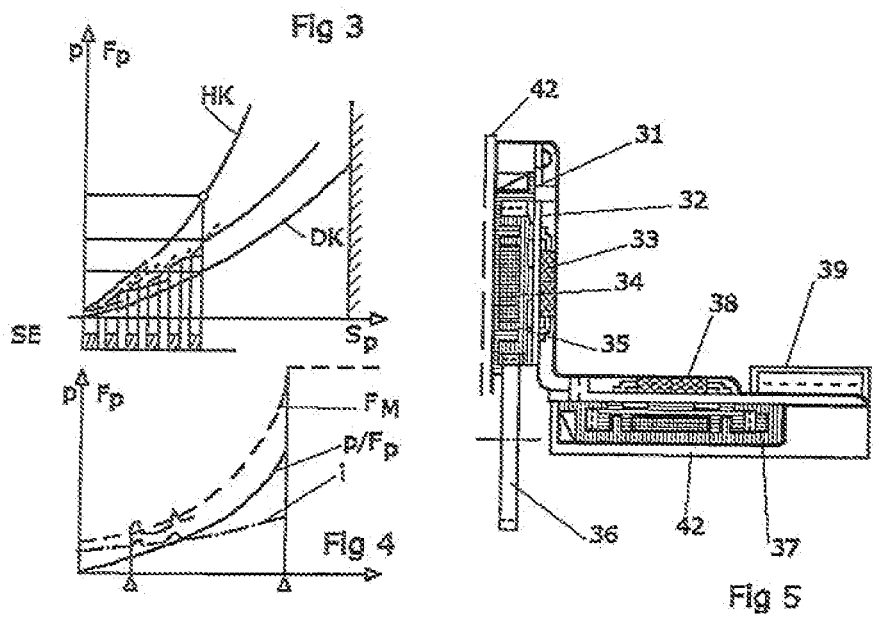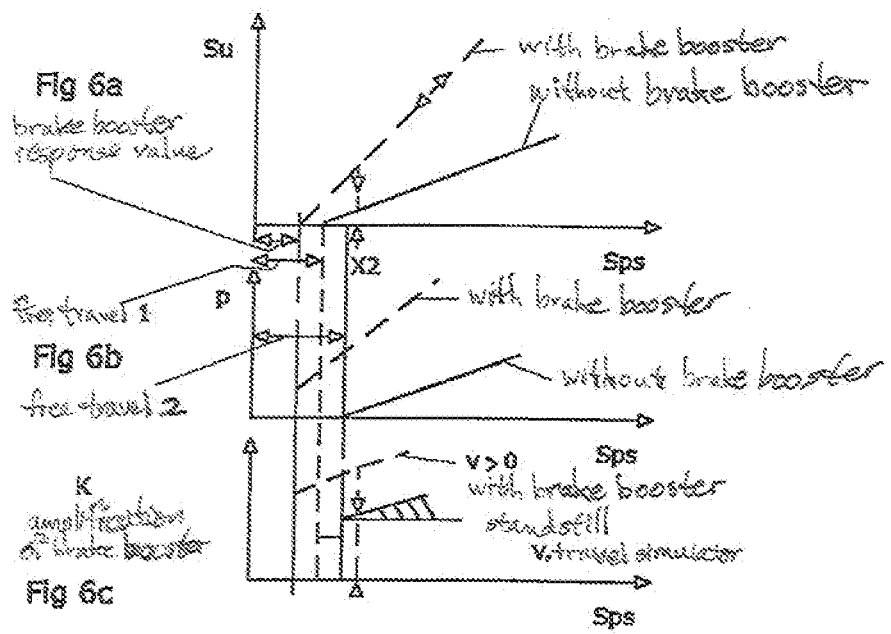

ACTUATING DEVICE FOR A MOTOR VEHICLE BRAKE SYSTEM

CROSS-REFERENCE TO RELATED APPLICATIONS

This Application is a National Stage of PCT International Application No. PCT/EP2011/004476, filed on Sep. 6, 2011, and claims priority of German Patent Application No. 10 2010 050 133.6, filed on Nov. 3, 2010 and German Patent Application No. 10 2010 045 617.9, filed on Sep. 17, 2010. The disclosures of the aforementioned applications are incorporated herein in their entirety by reference.

FIELD OF ENDEAVOR

The present invention relates to an actuating device for a vehicle brake system, comprising a first piston-cylinder unit, the at least one working space of which is to be connected to at least one wheel brake of the vehicle via at least one hydraulic line, further comprising an electromechanical drive device and an actuating device, in particular a brake pedal.

STATE OF THE ART

Brake systems of the brake-by-wire type use a travel simulator. These are so-called power-brake systems with pump and reservoir without any mechanical fallback solution, which are little used in passenger cars.

In systems, with a mechanical fallback solution the so-called EHB is known, see Braking Handbook of 2004, p. 272-274, in which a travel simulator is hydraulically operated by the main cylinder and a non-linear travel simulator spring acts on the piston. This connection can be isolated by means of a solenoid valve, in order that if the pressure supply is lost no pedal loss is taken into account by the volume take-up of the travel simulator. If the pressure supply fails during braking, however, system weakness is unavoidable and can lead to accidents. The principle of this concept is described in DE 102006056907. Here the solenoid valve is, if currentless, normally open, meaning that if the power fails a considerable pedal loss occurs through the take-up of the volume of the piston in the travel simulator.

Other solutions based on vacuum brake boosters are described in DE 10 2004 011622, the object of which is a secure activation of a travel simulator. Here the travel simulator is mechanically operated, combined with the pedal interface and can be deactivated by means of a magnet, if for example the brake booster fails. Here also a pedal travel loss results. In the same application a travel simulator is described, which is arranged in the front section in the axis of the brake booster. Here the travel simulator is locked via a magnet if the brake booster is intact. If the brake booster fails this locking does not work, and the brake pedal operates with less pedal loss on the tandem main cylinder for pressure generation. There is also a disadvantage here that in the event of failure of the brake booster during braking this pedal loss reoccurs. If the system is designed with a small free travel a, then the pedal tappet during ABS with a low coefficient of friction and small tandem main cylinder stroke already strikes the connecting tappet between the brake booster and the tandem main cylinder, so that the travel simulator effect is deactivated. This solution also involves a long installation length, which from the crash point of view is a disadvantage since, for example, the engine presses on the tandem main cylinder with the brake booster thereby pushing the pedal back leading to considerable foot injuries.

A further solution is described in DE 10 2008 063771. Here the travel simulator is mechanically operated with an electromechanical travel simulator arrest. This is deactivated if the brake booster or the power supply fails. Then the fallback solution, in which the pedal tappet impinges directly on the main cylinder, comes into play. Through decoupling the pedal tappet travel and the main cylinder piston travel via the travel simulator it is known that smaller piston diameters can be used, which in the event of brake booster failure results in smaller pedal forces. This solution is complicated and requires a long installation length.

A complaint about travel simulator systems is that when braking with the vehicle at a standstill the hard stop when the travel simulator actuates is perceptible and irritates the driver. During braking to a standstill this is not the case, since the foot force immediately follows the vehicle deceleration and the hard stop is only reached at full braking.

Systems with travel simulator are extremely safety-critical, since in the event of failure of the brake booster the fallback solution must operate reliably. This means that all safety-related components and functions must be diagnosable. These include, for example, the mobility of the travel simulator housing or pistons, and the functioning of the shutoff valves. In systems in which the push-rod piston during operation requires the volume in the travel simulator piston, the problem arises that in the event of failure of the brake booster this volume is missing from the brake circuit with subsequent correspondingly long pedal travels, which is irritating for the driver. This is particularly apparent in the extreme case in ABS control with low μ and full actuation of the travel simulator and subsequent positive μ jump with simultaneous brake booster failure. Here two effects occur in the same manner: considerable pedal travels and low distance of the push-rod piston from the floating piston, since the volume for the travel simulator has been taken from the push-rod piston circuit. In so doing, should the push-rod piston impinge on the floating piston no further pressure is built up in the push-rod piston circuit.

The specifications of the vehicle manufacturers call for very high pedal forces which are approximately 20 times higher than the pedal force for achieving the blocking pressure with high u. With today's systems the ABS/ESP function then deactivates, but the components such as main cylinder, seals, brake lines, and so on, must withstand pressures of up to 350 bar.

New vehicle designs call for short installation lengths, in particular between the bulkhead and the brake pedal linking.

OBJECT FOR THE INVENTION

The object for the invention is to provide an actuating device of the aforementioned type which in terms of installation length, reliability and pedal travel is an improvement on the known solutions.

SOLUTION OF THE OBJECT

The object may be solved according to the invention by various features recited in the accompanying claims.

With the solution according to the invention, in which a further piston-cylinder unit is used, in order to create an auxiliary piston, which is operated by the actuating device or by the pedal tappet and impinges on the first piston-cylinder unit or the main cylinder, in a surprisingly effective manner an actuating device for a vehicle brake system is provided, having a short installation length and high reliability and which extensively avoids pedal travel losses.

Advantageous embodiments or configurations of the invention are contained in various claims.

The further piston-cylinder unit or the auxiliary piston can in particular be disposed coaxially to the first piston-cylinder unit or main cylinder, but can also, especially due to space considerations, be operated by a lever system and be disposed in an offset manner.

The auxiliary piston is movable over the entire pedal stroke and displaces its volume in the mechanical hydraulic travel simulator. This is connected with the reservoir via a current-controlled 2/2-way solenoid valve. This solenoid valve receives a variable current as a function of the pedal stroke.

If for example the travel simulator piston jams, then this solenoid valve operates as a pressure relief valve, so that the auxiliary piston can move with increased foot force and if necessary impinges directly on the main cylinder piston. If necessary the brake booster can also be deactivated. This pressure relief function can be diagnosed via motor current, e.g., the armature current, of an electromechanical drive device.

The auxiliary piston and the solenoid valve diagnostics can be performed by connecting the drive device, especially the spindle, via a coupling to the auxiliary piston. Then the spindle and auxiliary piston are moved across the entire stroke and measured via the redundant pedal stroke sensors. Here the solenoid valve is open. In a second test the solenoid valve is closed, which cannot result in any movement of the auxiliary piston, and in so doing in particular the magnetic coupling is separate.

In this process the redundant pedal stroke sensors can also be tested. The volume of the auxiliary piston can also be provided to the push-rod circuit or other brake circuits in each case via a further 2/2-way solenoid valve or feed valve. In order in the event of failure of the brake booster keep the pedal forces low, small main cylinder piston diameters are necessary, but which at low pressures are known to require a lot of travel for the relatively flat shape of the pressure-volume curve. For this, especially at low pressures, the volume of the auxiliary pistons is used as a support. The feed valve can similarly be tested, in that the spindle moves the piston when the switching valves are closed, so that in the wheel brake cylinders no pressure is built up. When the feed valve is closed the pressure transducer measures an increase in pressure in the push-rod piston circuit, and none when the solenoid valve is open.

In DE 10 2009 0316728 similarly a differential piston via a 3/2 solenoid valve supplies volume to the small push-rod piston cylinder. This differential piston has a fixed connection with the push-rod piston however and is not isolated via a coupling. Furthermore, it is not designed for a travel simulator system.

In the critical case referred to of the failure of the brake booster at low µ the auxiliary piston can likewise provide support, in that the volume of the auxiliary piston and possibly also of the travel simulator is supplied to the push-rod piston circuit with the correct metering being controlled via the pressure transducer. This prevents excessive pedal travel.

If in the extreme case the drive should jam during pressure decrease, then via the open feed valve and pressure control valve volume can be released into the reservoir controlled via the pressure transducer. By means of a further feed valve per brake circuit this can also be applied for further brake circuits.

The pressure control valve is set to a maximum pressure according to the foot power in conventional systems, at which the ABS/ESP no longer functions. At very high foot powers when the maximum pressure is exceeded the auxiliary piston with the filled travel simulator moves on the main cylinder piston. In so doing it meets a stop, in this way high pressures are generated in the auxiliary piston and in the brake circuit only a pressure level which is necessary for the brake for fading. The brake system can thus be designed for lower pressures, saving cost and weight.

The auxiliary piston requires less installation space and is well-suited to the linking and securing of the sensors in a sensor module, comprising all sensors such as pedal stroke and angle of rotation. These can be mounted together with the connector plug or cable on a small circuit board.

According to the invention, therefore, a sensor module is also provided for, which on the actuating device groups together sensors to be used in a single unit in a simple and advantageous manner.

In patent application DE 10 2010 045 617.9 an actuating device of the aforementioned type is already described, having a further piston-cylinder unit, the piston of which can be actuated by means of the actuating device and which is connected via a connecting device with a piston of the first piston-cylinder unit. An integrated electromotive drive is provided here to serve as a booster. Although compared to the state of the art this solution has numerous considerable advantages, it is not possible or desirable in every application. Thus there are cases in which the booster, e.g. in the form of an electromotively operated pump, is already present, so that in principle only a master cylinder is necessary. This applies, for example, to electrohydraulic brake systems, as described in the "Braking Handbook", $1^{st}$ Edition, Vieweg Verlag.

The invention therefore also provides an actuating device, which improves on the known solutions and which can advantageously be used on systems with existing boosters, such as for example an EHB.

With this solution, in which the piston of the further piston-cylinder unit is actuated by the actuating device, in a surprisingly advantageous manner an actuating device for a vehicle brake system, in particular a motor vehicle brake system, is provided which can be used in many different ways, in particular in cases where a booster device is already provided or specified.

Thus the advantages of a further piston-cylinder unit (auxiliary piston), which result especially from the fact that in the event of a failure of the brake boosting additional hydraulic volume can be fed into the brake circuits, can be applied in many different ways. Further advantages consist of smaller pedal travels and higher achievable pressure levels. In DE 10 2009 031 672 a brake system is indeed already described, in which by means of an additional piston-cylinder-device (additional piston) additional hydraulic medium can be supplied in a compensation reservoir or in a brake circuit. In this system, however, the additional piston is operated by an, especially, electromagnetic drive.

Furthermore, by means of the pressure in the cylinder of the second or first piston-cylinder unit a travel simulator can be operated. Here the travel simulator can be deactivated especially via a solenoid valve.

The further piston-cylinder-unit can advantageously be activated and deactivated by means of a solenoid valve.

As illustrated in patent application DE 10 2010 045 617.9 there are various advantageous embodiments of the spatial disposition of the further piston-cylinder unit in relation to the tandem main cylinder. Reference is made for disclosure purposes to these statements, with which an adaptation of the various spatial conditions, for example also a reduction in the installation length, is easily possible.

The invention also further concerns a method for operation of an actuating device for a vehicle brake system, and advantageous configurations of this method. With this method in an advantageous manner via a further piston-cylinder unit and a solenoid valve pressure medium is supplied to the main cylinder. If necessary, that is to say if in the brake circuit additional pressure medium is necessary or expedient, this can be supplied from the further piston-cylinder unit and/or a travel simulator and/or a reservoir. In order to reduce the pressure for free travel control and/or fault cases pressure medium can be discharged by a solenoid valve into the reservoir. This can be applied for one or more brake circuits. Here via this connection pressure can also be used from the reservoir to fill the brake circuits. This is useful if small main cylinders with lower volumes are used, which for example during fading require more volume.

According to the invention a method is also provided for operation of an actuating device of a motor vehicle brake system, wherein a piston-cylinder unit connected with at least one wheel brake is supplied with pressure medium. Here via a further piston-cylinder unit, a displacement sensor and/or via a NO valve the piston-cylinder unit is supplied with pressure medium and by means of a booster disposed between the piston-cylinder unit and the wheel brakes, the pressure supplied to the wheel brakes is boosted.

If necessary, especially if the brake power boosting fails or for braking with strong regeneration or ABS regulation with a low μ with low pressure level in the wheel brakes, the volume metered into the brake circuits can be supplied here from the further piston-cylinder unit and/or from the travel simulator. Here a volume stored in a storage compartment can if required be supplied to the brake circuits.

BRIEF DESCRIPTION OF THE DRAWINGS

With the help of the drawings, in the following description features and advantages of the invention and its configurations are described in more detail.

The drawings show as follows:

FIG. 3 the pressure build-up with the use of the further piston-cylinder unit or the auxiliary piston in the event of failure of the brake booster;

FIG. 4 pressure control of the solenoid valve;

FIG. 5 the arrangement of sensors used in the actuating device on a single module;

FIGS. 6a-c the path of the push-rod piston travel and pedal tappet, pressure and brake booster boosting;

DETAILED DESCRIPTION OF VARIOUS ASPECTS OF THE DISCLOSURE

Figure 1:
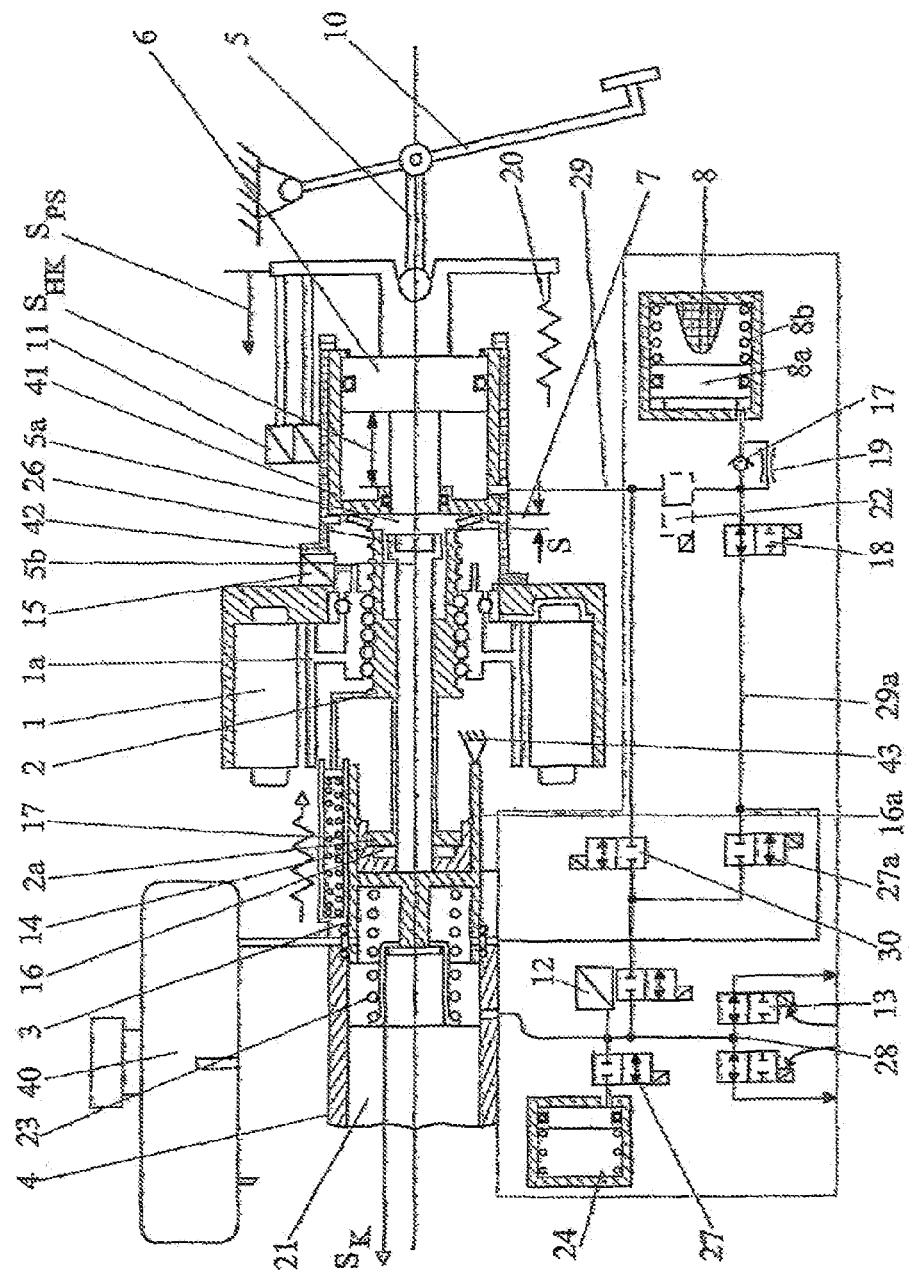
FIG. 1 system configuration of an actuating device according to the invention of a motor vehicle brake system.

FIG. 1 shows in a transparent manner the configuration of the system with the known basic components such as electric motor 1, rotor with spindle nut 1a, spindle 2, push-rod piston 3, tandem main cylinder 4, return spring for push-rod piston 23, floating piston 21, 2× shutoff valves 13, (storage compartment 24 with 2/2 solenoid valve 27 according to DE 10 2009 055721 with push-rod piston brake circuit 28), engine position encoder 15 with redundant pedal travel sensors 11, brake pedal 10 with pedal tappet 5. These components are for example described in DE 10 2005 018649A1, reference to the full content of which is made here for the sake of simplicity.

The brake pedal 10 operates by means of the pedal tappet 5 on the auxiliary piston 6, wherein the volume displaced by this via a line 45 reaches the mechanical hydraulic travel simulator 8. With the movement of the auxiliary piston 6 the redundant pedal travel sensors 11 are connected, controlling the engine and at the same time operating the NO 2/2-pressure regulation solenoid valve 18, that is to say closing it.

The desired repercussion on the pedal force is generated by the travel simulator 8. The auxiliary piston 6 is blocked in an intermediate position with approximately 40% of the total piston travel $S_{HK}$, if the travel simulator piston 8a comes up against a stop. The solenoid valve 18 has a pressure control function for safety reasons. As a function of the travel simulator spring 8b in the auxiliary piston 6 a pedal travel-dependent pressure develops which corresponds to the pressure control function shown in FIG. 4. Should the travel simulator piston 8a jam, then the pedal travel-pressure function is impaired, that is to say that via the solenoid valve 18 pressure medium flows through the line 29a to the reservoir 40.

With corresponding refinement of the response and switching behaviour, e.g. opening of the solenoid valve 18 with removal of pedal movement control according to the solenoid valve 18, the feedback function of the travel simulator 8 with piston and spring can be replaced, so that these can be dispensed with. In parallel with the solenoid valve 18 a non-return valve (not shown) for the reservoir may be necessary, in order to avoid a depression during backwards movement of the auxiliary piston.

The pressure control function is also used if the extreme pedal forces described operate. If a corresponding force is exceeded, then pressure medium flows away and the auxiliary piston 6 moves once the travel $S_{HK}$ comes up against a stop in the housing 41. Depending on the position of the push-rod piston 3 and the coupled transmission tappet 5b the auxiliary piston 6 impinges on this and generates an additional pressure in the tandem main cylinder 4, but which through its dimensioning corresponds to the maximum required brake pressure, but not an excess pressure due to the high pedal forces. Thus for the dimensioning, weight and cost savings are possible. With this overstressing the motor and thus also the ABS/ESP function are deactivated. The higher pressure operates exclusively on the auxiliary piston 6 and travel simulator 8.

For a good response characteristic it is known to build in throttling of the operation as a function of the speed and direction. For this in the line to the travel simulator 8 a choke 19 is fitted and for rapid return a non-return valve 17. The auxiliary piston 6 is reset via return spring 20. The auxiliary piston 6 with seals is guided and supported in a suitable housing 41. This housing 41 can be connected via a multi-part intermediate housing 42 in particular in plastic with the motor 1. Housing 41 and intermediate housing can also be one-piece.

At faster pedal speed through the choke 19 a higher pressure results. Accordingly the setting of the pressure control valve 18 until activation of the movement must be correspondingly higher.

In the event of failure of the brake booster the auxiliary piston 6 can continue to be used to optimise the braking effect. In the event of failure of the brake booster the pedal force should be as small as possible, which calls for small main cylinder piston diameters. If these are used, then in the low pressure range high pedal travels are necessary due to the flat shape of the pressure-volume curve.

Via a NO 2/2-way solenoid valve, which is open if currentless, or feed valve 30 ($S_E$) in the lower pressure range of the auxiliary piston 6 pressure medium can be supplied for pressure build-up in the piston circuit 28. During pressure reduction via the pressure transducer 12 pressure medium can be delivered back again to the auxiliary piston.

A further critical case is described in the introduction, if during ABS operation on ice the brake booster fails and then a positive μ jump during braking occurs. In this case in the brake circuits a low pressure in the limiting case is 1-2 bar, so that the starting range of the pressure-volume curve at the actuation point of the travel simulator begins at approximately 40% pedal travel, which at the same time represents a piston travel and thus volume loss.

In systems in which the push-rod piston operates the travel simulator 8, then in this case the clearance to the floating piston is correspondingly small, with the result that, in this critical case, with subsequent pressure build-up, only a very low pressure is possible in push-rod piston circuit, which has a highly detrimental effect on the possible braking effect. The abovementioned DE 10 2009 055721 describes a system for free travel control of the piston during ABS operation. In order that in the lower pressure range during ABS control push-rod piston does not impinge on the pedal tappet, then a corresponding piston travel and thus clearance to the pedal tappet=travel is achieved in that a corresponding volume is passed into a storage compartment 24. The advantage of this system in a critical case is that part of the volume can be recovered in the brake circuit.

Instead of the storage compartment 24 with solenoid valve 27, for simplification just a 2/2-way solenoid valve 27a can be used, for free travel control, that is to say when the clearance from the auxiliary piston 6 or pole piece to the transmission tappet is too small. If the free travel is excessive through corresponding piston control volume can be sucked from the reservoir 40, so that this solenoid valve operates in both directions.

This 2/2-way solenoid valve can also be used for the same function for one or more brake circuits, e.g. in the floating piston circuit, instead of storage compartment 24 and upstream 2/2-way solenoid valve 27.

These valves can be used for an additional function of taking back volume by corresponding piston control from the reservoir. This replaces the supply compartment, for providing additional volume in the brake circuit, if the main cylinder piston no longer achieves the necessary pressure. For this it is advantageous to design the main cylinder seals to be stronger in order to be vacuum-tight. A switching device, e.g. a solenoid valve, can also be provided between the reservoir and the main cylinder. This is to prevent air being sucked into the brake circuit during the above supply process. From the pressure and the piston position the volume is calculated which at the end of braking is discharged into the reservoir again via the valve 27a. This avoids the main cylinder seals being placed under excessive stress.

Both cases and solutions with storage compartment or valve 27a can be further improved if necessary, by using the volume of the auxiliary piston in this critical case to improve the braking effect via the feed valve $S_E$ 30. The necessary feed and recovery of the auxiliary piston is controlled via the pressure transducer.

An additional feed valve can also be used for further brake circuits, e.g. the floating piston circuit, in order in the limiting case illustrated as the tailback solution to also supply volume from the auxiliary piston in the floating piston circuit, in order to achieve a higher pressure level or a shorter pedal travel.

Reliable diagnosis of the valves 30 and 27a, which open the brake circuit(s) to the auxiliary piston 6 and to the reservoir, is of essential importance. This can take place with the proposed diagnostics procedure once the door is opened by means of piston movement and pressure measurement.

Here the volume stored in the travel simulator 8 can also be used or isolated via a isolation valve 22, With the potential of the auxiliary piston a decisive step towards improving failure safety is possible.

Of equal importance is the diagnosis of the functionally relevant components. For this the system has two or at least one coupling. The first frictional coupling 14 in particular embedded with a permanent magnet 16 in a magnet housing 16a, impinges on a pole piece 2a of the spindle. This coupling is necessary on the one hand so that by means of the coupling force, especially at low pressures, the piston return via the spindle is amplified.

The second coupling impinges on the front end of the transmission tappet 5b, which has a fixed connection via the magnet housing with the push-rod piston 3. This frictional second coupling is in particular configured with a permanent magnet with pole 5a on the auxiliary piston. Between the pole 5a and transmission tappet 5b/26 a small free travel is provided, which inter alia is used for the pedal characteristic and calibration of the pedal travel sensors.

For diagnosis of the auxiliary piston movement the spindle 2 with coupling 26 is driven back, until with a free travel of 0 the full coupling force is effective. Here the push-rod piston in particular is up against the stop 43. With the subsequent forward movement the auxiliary piston can also be moved over the full stroke S and measured via the pedal travel sensors 11. In the event of excessive frictional force in the piston or inadequate coupling force the movement stops and the fault is detected. During this movement the valve 18 is open. During a second movement the valve 18 is closed, the movement of the auxiliary piston is stopped via 17 and measured via sensor 11.

The diagnosis of the pressure control of the valve 8 is illustrated in FIG. 4.

The diagnosis of the feed valve $S_E$ 30 with travel simulator 8 takes place by pressure build-up via the spindle and piston with closed switching valves 13. Here testing can take place via the pressure transducer and the piston travel along with the feed valve 30 as well as the travel simulator. For resetting the spindle the return spring 17 is placed at the spindle exit and for structural reasons twice parallel to the tandem main cylinder 4.

The storage compartment 24 with switching valves 13, 47 is shown here only in the push-rod piston circuit and described only for the function of the two brake circuits in DE 10 2009 055721.

For the diagnosis described the state of the vehicle at a standstill is used, in particular after opening the door to enter the vehicle prior to starting. In this case the vehicle may have been at a standstill for a long period with all the conceivable influences affecting its function such as corrosion, hardening of seals and so on.

The cases described with failure of the brake booster are based on a functioning onboard vehicle electrical system. A total failure of the onboard vehicle electrical system during a journey is not assumed by the OEM. If nevertheless demands should be made of the additional functions described of the auxiliary piston and the switching of the solenoid valve, then this can be resolved by a separate emergency circuit via an ASIC with a small storage capacitor or auxiliary battery.

Figure 2:
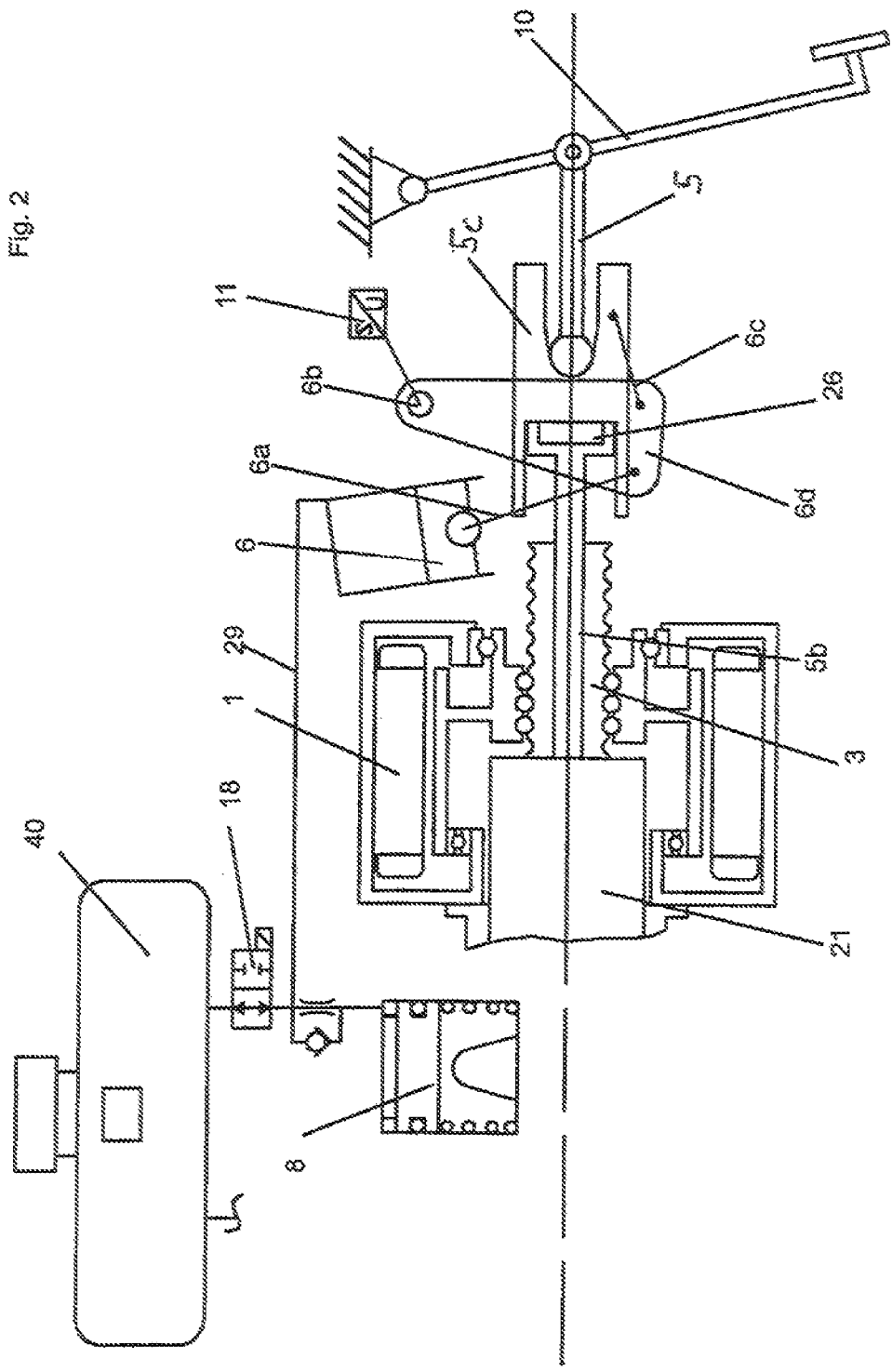
FIG. 2 an alternative arrangement of the further piston-cylinder unit or of the auxiliary piston.

In FIG. 2 an alternative arrangement of the further piston-cylinder unit is shown. The auxiliary piston 6 is not concentric in this arrangement, but is disposed with an offset to the operational axis of the push-rod piston 3. The transmission of the pedal force from the pedal 10 via the pedal tappet 5 and transmission element 5c takes place via a gear unit. Here this has a triple joint design, for example.

The pivot joint operates as follows. The first connecting rod 6c steers the force into the articulated beam 6d. This rotates about the axis of rotation 6b. In so doing the second connecting rod 6a moves, which is supported by the piston 6. Thus the fluid in the master cylinder 1 is displaced via the line 20 into the travel simulator 8. This generates a counter-pressure. Thus at the pedal 10 a counter-force results, so that the pedal feel of a conventional braking system is simulated for the driver. The rotation of the articulated beam 6d can be assigned to a defined pedal position. Thus it is possible via, for example, a rotary sensor 11 to capture the pedal stroke. These two connecting rods 6c and 6a are in particular designed in such a way that they are at a slight angle to the operational axis 2 and the axis of the piston 6. As a result the transverse forces occurring when the brakes are operated are low.

The transmission element 3 which is in particular designed as a spindle is driven by a brake booster 1, which is in particular designed as an electric motor. This transfers an axial force to the piston 3, which in a main cylinder according to the art which is not shown delivers the brake fluid into the brake circuit which is not shown.

In the fallback solution the solenoid valve 18 is opened. Thus if the pedal is moved the fluid is not displaced into the travel simulator 8 but is able to flow without counter-pressure into the reservoir 40. Thus at the pedal no hydraulic loss of power of any note occurs. Accordingly the entire pedal force can be transferred from the transmission element 5 to the piston 3. In particular, between the transmission element 5 and the piston 3 an operating tappet 5b is disposed which engages via the transmission element 3 and has a distance s from this. Thus the piston 3 can also be operated if, for example, the transmission element 3 were to jam.

An advantage of disposing the master cylinder 1 with an offset to the operational axis 2 is that the total installation length can be reduced. In vehicles with a short distance between the pedal 10 and the bulkhead this is an advantage. Thus it is possible to bring the brake system closer to the brake pedal. As a result the installation space requirement in the engine compartment is reduced which has a positive effect, especially in the event of a crash.

FIG. 3 shows the course of the pressure or pedal force and the pedal tappet travel, Sp upon pressure build-up of the push-rod piston and auxiliary piston. Through switching at intervals, e.g. as a function of pressure via the $S_E$ valve, at time a, a considerably higher pressure level can be generated for the same pedal tappet travel $S_D$, than with just the push-rod piston and with considerably lower pedal forces than with the additional auxiliary piston. This means on the other hand that the flat part of the p-V characteristic curve does not require so much pedal travel and with the subsequent steeper course of the p-V characteristic curve the smaller push-rod piston can be switched to.

FIG. 4 shows the course of the pressure, pedal force and valve closing force FM across the travel of the pedal tappet Sp. In travel simulator systems as a rule the course of the pedal travel force is modelled, in particular in the lower pressure range. At higher pressures the characteristic curve is steeper, in order to save pedal travel, which in turn in the event of an emergency stop reduces the response time. The progression of the limiting current i is also shown, at which the current is known to have a quadratic effect on the magnetic force FM and thus the valve closing force. In the position $S_{P1}$ it is now assumed that the travel simulator piston clamps leading to an increase in pedal force and thus pressure. The switching limit $FM_1$ is exceeded, which then leads to further pedal movement, since the volume from the auxiliary piston passes through the valve until at $S_{P2}$ the magnetic force $FM_2$ is again higher which in turn leads to a repeated pedal movement. This assigned movement of the solenoid armature generates a current or voltage change, which in relation to the pedal tappet movement SP can be evaluated for the purpose of diagnosis. Pressure regulation as a function of the speed of the brake pedal or connected auxiliary piston has already been mentioned.

The actual current upon closing of the valve can also be determined for the respective SP value. A braking process in particular with the vehicle at a standstill presents itself. Here the corresponding current can be reduced from the limiting value as a function of time until the pressure force on the valve is greater than the magnetic force. Here a pedal tappet movement takes place which is measured and then immediately the current is raised again to the limiting value. If this response does not take place, then an error function is present so that then in a repeated test the brake booster can be deactivated.

In position $S_{P2}$ the travel simulator is actuated. If now the high pedal force occurs, then at corresponding pressure the closing force of the valve is exceeded. The auxiliary piston moves under this high pressure as far as the stop in the housing.

FIG. 5 shows the combining of several sensors into a module. FIG. 1 described how the system requires a position encoder for capturing the rotor movement and thus the position of the piston and 2 (redundant) pedal travel sensors. These are disposed spatially in the pedal interface. With a corresponding design of the pedal interface, it is possible to combine these in a single module with a shared electrical connection 39 (plug or multi-core cable) to the ECU.

The sensor component 33/33a, e.g. Hall IC, is mounted on the printed circuit board (PCB) 32. On the other side of the PCB 32 a rotor 35 is mounted in the housing 31. In the rotor the permanent magnet 34 is disposed with corresponding polarity for activation of the sensor. The sensor optionally delivers an analogue or digital signal. The rotor can be moved by means of a toothed wheel 36, for example with the spindle nut, or a gear rack 37 connected with the auxiliary piston. The sensor module is secured to the intermediate section of the housing and disposed within a screening plate 38 or housing.

FIG. 6a shows the relationship between the push-rod piston travel $S_K$ and the pedal tappet travel with and without brake booster. Once the brake booster response value has been passed, essentially dependent upon the pedal travel sensor, very quickly the movement $S_K$ of the push-rod piston occurs. With the brake booster this runs ahead of the pedal tappet. If the brake booster fails a free travel 1 takes place until the pedal tappet meets the push-rod piston and moves this.

FIG. 6b shows the course of the pressure with and without brake booster. After the response value of the brake booster a jump (so-called jumper function) in the pressure build-up occurs and then this proceeds as a function of the travel simulator design. Without brake booster a free travel is necessary until the push-rod piston closes the sniffer hole and then the pressure rises.

FIG. 6c shows the brake booster boosting as a function of the pedal tappet travel at the top at v>0 with travel simulator, thus in normal operation. When the vehicle is at a standstill a switch is now possible from travel simulator function at X to conventional follower amplifier function.

Here the pedal tappet impinges on the push-rod piston. Once the free travel 1 has been passed the amplification is effective, so that the restoring forces of the piston and spindle are less perceptible and after free travel 2 when the pressure builds up increases further. Here the amplification can be selected in such a way that the same pedal feel results as with the travel simulator, but without the stop.

Here the sequences have be shown if the vehicle is at a standstill during braking.

For $X_2$ FIGS. 6a and 6c show when the vehicle is braked from v>0. Here in the area between free travel 1 and 2 of the floating piston the value of the pedal tappet is used for control. If a certain pressure, e.g. braking at 10 bar to a standstill is maintained, then at this value similarly the push-rod piston travel $S_K$ will be brought into line with the Sps value.

Figure 7:
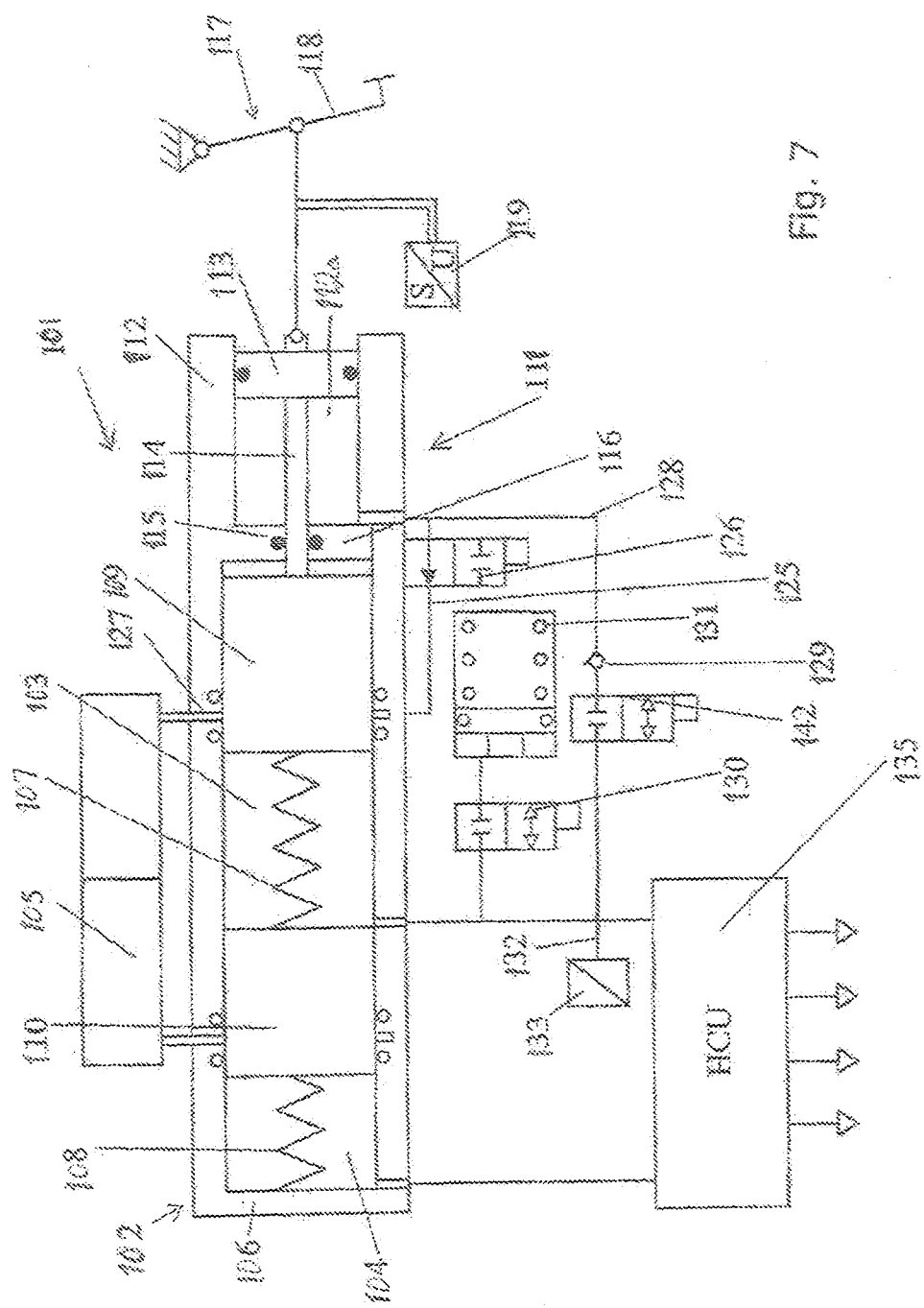
FIG. 7 another configuration of an actuating device according to the invention.

FIG. 7 shows an actuating device 110 for a vehicle brake system. The actuating device 110 has a tandem main cylinder 102, the pressure chambers 103, 104 of which are connected with an unpressurised compensation reservoir 105. In the housing 100 of the tandem main cylinder 102, supported by springs 107, 108, sealed axially displaceable cylinders 109, 110 are disposed. At one end of the tandem main cylinder 102 a further piston-cylinder unit 111 is connected with the tandem main cylinder 102 or is integrated within this. This second piston-cylinder unit 111 can, for example for reasons of reduced installation length, also be disposed outside of the axis of the tandem main cylinder 102, as shown in DE 10 2010 045 617.9 from the same applicant, reference to the full content of which is made here for the purposes of disclosure, or in the form of a differential piston, which with an annular space formed by a partially expanded diameter of a partially reduced diameter forms a second piston-cylinder unit, from which additional volume can be supplied, as is explained in DE 10 2009 031672 from the same applicant. In the cylinder part 112 of this second piston-cylinder unit 111 an axially displaceable piston 113 is disposed, having an extension 114, which penetrates in a sealed manner an opening 115 in an intermediate wall 116 and rests on the piston 110, in order to impinge on this.

An actuating device 117 in the form of a brake pedal 118 is connected with the piston 113 via a rod assembly 122.

From the pressure chamber 112a formed by the cylinder of the second piston-cylinder unit 111 a hydraulic line 125, in which a NO 2/2-way valve 126 is connected, leads via an annular groove 127 formed in the tandem main cylinder 102 to the compensation reservoir. From this hydraulic line 125 a further hydraulic line 128 branches off, in which a non-return valve 129 is arranged and which leads to the pressure chamber of the tandem main cylinder. Alternatively a NC solenoid valve 142 can also be used.

This alternative has the advantage that both the volume supply from the additional piston-cylinder unit 111 in terms of pressure level and the pressure reduction are controlled via the pressure transducer 133. In this case the volume reaches the reservoir via the line 128 and the solenoid valve 126.

From the hydraulic line 128 a hydraulic line 129 branches off, which via a NC 2/2-way valve 130 leads to a hydraulic travel simulator 131.

In the hydraulic line 132 a pressure or pressure transducer 133 is disposed. A hydraulic line leads from the line 128 to a unit (HCU) 135, which can contain valves in configurations not shown in more detail, in order to control or regulate the pressure in the (similarly not shown) wheel brakes.

The HCU also contains an amplifier, which has at least a pressure generator, such as for example an electric motor and pump with corresponding control elements and thus forms an electro-hydraulic brake unit (EHB).

The method of operation of the configuration shown in FIG. 7 is explained in the following:

Upon operation of the actuating device or the brake pedal 118 the piston 113 in FIG. 7 is displaced to the left and in doing so forces the hydraulic medium through the line 128 and the open valve 126 into the compensation reservoir. At the same time, via the extension 114 the push-rod piston 109 is moved to the left. The resultant pressure in the pressure chamber 103, when the 2/2-way valve 130 is open can impinge with pressure upon the piston of the travel simulator working against the spring pressure. In other words with this construction the travel simulator 131 is controlled by the pressure in the push-rod piston-circuit and can be deactivated via the 2/2-way valve. Here the pressure built up is measured by the pressure transducer and the measured values passed to an evaluation unit (ECU) which is not shown. The pressure desired by the driver or the resultant braking effect is determined by a travel sensor 119 on the brake pedal, the measured values of which are passed to the ECU and compared with the values of the pressure transducer. Here the functionality of the travel simulator 131 can be achieved here by means of a device with two elements arranged between brake pedal 118 and piston 113 and movable in relation to one another and, supported against one another by an elastic member, the relative movement of which is measured by two displacement sensors (of which only one is shown here) and evaluated by the ECU. Alternatively also the signal from the displacement sensor 119 can be compared with the signal from pressure transducer 133 and in the event of an implausible correlation the brake booster function deactivated and this signal given out as a warning indicator.

In the event that the amplifier fails (fallback solution), the 2/2-way valve 126 can be closed, so that the volume displaced by the piston 109 or 113 is used in full for pressure generation, wherein the hydraulic volume displaced in the further piston-cylinder unit 111 can be provided to the brake circuits as additional volume. Here control of the solenoid valve 126 can take place via the pressure transducer 133, so that for example the feeding of hydraulic medium into the brake circuit only takes place at up to around 20 bar. The control of the pressure reduction can also take place via this solenoid valve, as already mentioned.

The piston-cylinder unit can also be represented by two units parallel to the axis, e.g. outside of the tandem main cylinder, which has an advantageous effect on the installation length.

According to a further aspect of this disclosure, a redundant solenoid valve power supply may be provided, which may be used in case of total failure of the vehicle's onboard electrical system.

LIST OF REFERENCES

1 Electric motor
1a Rotor with spindle nut

2 Spindle
2a Pole piece of the spindle
3 Push-rod piston
4 Tandem main brake cylinder
5 Pedal tappet
5a Pole at auxiliary piston
5b Transmission tappet
5c Transmission element
6 Auxiliary piston
6a First connecting rod
6b Axis of rotation of articulated beam
6c Second connecting rod
6d Articulated beam
7 Free travel (s) at pedal tappet
8 Travel simulator or travel simulator housing
8a Travel simulator piston
8b Travel simulator spring
10 Brake pedal or actuating device
11 Pedal travel sensor
12 Pressure transducer
13 Switching valve
14 First coupling
15 Position encoder
16 Permanent magnet
16a Magnet housing
17 Spindle return spring
18 Pressure regulation solenoid valve $S_D$
17 Non-return valve
19 Choke
20 Return spring for auxiliary piston
21 Floating piston
22 Isolation valve for travel simulator
23 Return spring for push-rod piston
24 Storage compartment
26 Second coupling
27 2/2-way solenoid valve for storage compartment
27a 2/2-way solenoid valve for free travel control
28 Brake circuit push-rod piston
29 Line to travel simulator
29a Line to reservoir
30 Feed valve $S_E$ or 2/2-way valve
31 Sensor housing
32 PCB or film
33 Sensor component of rotation angle sensor
33a Sensor component of pedal travel sensor
34 Magnet
35 Rotor
36 Toothed wheel
37 Gear rack
38 Screening plate
39 Electrical connection
40 Reservoir
41 Housing for auxiliary piston
42 Housing intermediate part
43 Push-rod piston stop
45 Line
101 Actuating device
102 Piston-cylinder unit or tandem main cylinder
103 Pressure chamber
104 Pressure chamber
105 Compensation reservoir
106 Housing
107 Spring
108 Spring
109 Piston (push-rod piston)
110 Piston (floating piston)
111 Piston-cylinder unit
112 Cylinder part
112a Pressure chamber
113 Piston
114 Extension
115 Opening
116 Intermediate wall
117 Actuating device
118 Brake pedal
119 Pedal travel sensor
122 Rod assembly
125 Hydraulic line
126 2/2-way valve
127 Annular groove
128 Hydraulic line
129 Non-return valve
130 2/2-way valve
131 Travel simulator
132 Hydraulic line
133 Pressure sensor or pressure transducer
135 HCU
142 Solenoid valve

What is claimed is:

1. An actuating device for a vehicle brake system, comprising:
a first piston-cylinder unit, at least one working space of which is to be connected to at least one wheel brake of the vehicle via at least one hydraulic line;
an electromechanical drive device;
an actuating unit, wherein the actuating device comprises a further piston-cylinder unit, a piston of which can be actuated by means of the actuating unit, and wherein the further
piston-cylinder unit is connected to a piston of the first piston-cylinder unit via a connecting device, wherein the further piston-cylinder unit is hydraulically connected to a travel simulator to enable operation of the travel simulator;
wherein the actuating device is configured to provide pressure medium from the further piston-cylinder unit and/or from the travel simulator into brake circuits if brake boosting fails; and
wherein the further piston-cylinder unit is disposed concentrically to the first piston-cylinder unit.

2. The actuating device according to claim 1, further including:
a reservoir; and
a pressure medium valve connected with the reservoir arranged in a respective one of the brake circuits.

3. The actuating device according to claim 1, wherein multiple functionally-related components can be diagnosed with regard to error-free operation.

4. The actuating device according to claim 1, further including a redundant solenoid valve power supply provided in the event of a total failure of an onboard electrical system of the vehicle.

5. An actuating device for a vehicle brake system, comprising:
a first piston-cylinder unit, at least one working space of which is to be connected to at least one wheel brake of the vehicle via at least one hydraulic line;
an electromechanical drive device;
an actuating unit, wherein the actuating device comprises a further piston-cylinder unit, a piston of which can be actuated by means of the actuating unit, and wherein the further piston-cylinder unit is connected to a piston of the first piston-cylinder unit via a connecting device, wherein the further piston-cylinder unit is hydraulically connected to a travel simulator to enable operation of the travel simulator;

wherein the actuating device is configured to provide pressure medium from the further piston-cylinder unit and/or from the travel simulator into brake circuits if brake boosting fails; and wherein the connecting device has at least one coupling.

6. The actuating device according to claim 5, further including:
a reservoir; and
a pressure medium valve connected with the reservoir arranged in a respective one of the brake circuits.

7. The actuating device according to claim 5, wherein multiple functionally-related components can be diagnosed with regard to error-free operation.

8. The actuating device according to claim 5, further including a redundant solenoid valve power supply provided in the event of a total failure of an onboard electrical system of the vehicle.

9. An actuating device for a vehicle brake system, comprising:
a first piston-cylinder unit, at least one working space of which is to be connected to at least one wheel brake of the vehicle via at least one hydraulic line;
an electromechanical drive device;
an actuating unit, wherein the actuating device comprises a further piston-cylinder unit, a piston of which can be actuated by means of the actuating unit, and wherein the further piston-cylinder unit is connected to a piston of the first piston-cylinder unit via a connecting device, wherein the further piston-cylinder unit is hydraulically connected to a travel simulator to enable operation of the travel simulator;
wherein the actuating device is configured to provide pressure medium from the further piston-cylinder unit and/or from the travel simulator into brake circuits if brake boosting fails; and
wherein the actuating device further comprising a hydraulic connection between the further piston-cylinder unit and at least one working space of the first piston-cylinder unit including a NC valve that is closed if currentless.

10. The actuating device according to claim 9, further including:
a reservoir; and
a pressure medium valve connected with the reservoir arranged in a respective one of the brake circuits.

11. The actuating device according to claim 9, wherein multiple functionally-related components can be diagnosed with regard to error-free operation.

12. The actuating device according to claim 9, further including a redundant solenoid valve power supply provided in the event of a total failure of an onboard electrical system of the vehicle.

13. An actuating device for a vehicle brake system, comprising:
a first piston-cylinder unit, at least one working space of which is to be connected to at least one wheel brake of the vehicle via at least one hydraulic line;
an electromechanical drive device;
an actuating unit, wherein the actuating device comprises a further piston-cylinder unit, a piston of which can be actuated by means of the actuating unit, and wherein the further piston-cylinder unit is connected to a piston of the first piston-cylinder unit via a connecting device, wherein the further piston-cylinder unit is hydraulically connected to a travel simulator to enable operation of the travel simulator;
wherein the actuating device is configured to provide pressure medium from the further piston-cylinder unit and/or from the travel simulator into brake circuits if brake boosting fails;
wherein the actuating device further including a hydraulic connection between the further piston-cylinder unit and a reservoir; and
wherein the hydraulic connection includes a NO valve that is open if currentless.

14. The actuating device according to claim 13, wherein regulation of the NO valve that is open if currentless is a function of signals of at least one pedal travel sensor.

15. The actuating device according to claim 13, further including:
a reservoir; and
a pressure medium valve connected with the reservoir arranged in a respective one of the brake circuits.

16. The actuating device according to claim 13, wherein multiple functionally-related components can be diagnosed with regard to error-free operation.

17. The actuating device according to claim 13, further including a redundant solenoid valve power supply provided in the event of a total failure of an onboard electrical system of the vehicle.

\* \* \* \* \*